United States Patent [19]

Israely

[11] Patent Number: 4,727,387

[45] Date of Patent: Feb. 23, 1988

[54] PAPER-HANDLING MECHANISM FOR LASER PRINTER

[75] Inventor: Ilan Israely, Encino, Calif.

[73] Assignee: Blaser Industries, Inc., Los Angeles, Calif.

[21] Appl. No.: 65,843

[22] Filed: Jun. 24, 1987

[51] Int. Cl.⁴ .............................................. G01D 15/10
[52] U.S. Cl. .................................. 346/160; 355/145 H
[58] Field of Search ...................... 346/160, 76 L, 134, 346/136, 107, 108 R; 271/3, 36 T, 145; 355/72, 73, 74, 35 H, 145 H; 101/232, 242

[56] References Cited

U.S. PATENT DOCUMENTS 4,279,504 7/1981 Brown et al. ................... 355/145 H
4,630,129 12/1986 Hayashi et al. ..................... 346/166

Primary Examiner—Arthur G. Evans
Attorney, Agent, or Firm—Ratner & Prestia

[57] ABSTRACT

A paper-handling mechanism for a laser printer is positioned below the laser printer engine and is confined within the limits of an area defined by the vertically downward projections of the edges of the fixed are a occupied by the laser printer engine. The paper-handling mechanism comprises a vertically positioned open top ended supply magazine for a stack of cut sheet paper, feed means for feeding cut sheets of paper one at a time upwardly from the supply magazine into the printing station of the laser printer engine, an open top ended output tray positioned vertically for receiving the sheets of paper from the printing station and feed means for delivering sheets of paper one at a time from the printing station to the output tray.

7 Claims, 2 Drawing Figures

PAPER-HANDLING MECHANISM FOR LASER PRINTER

BACKGROUND OF THE INVENTION

1. Field of the Invention

This invention relates to laser printers and in particular to a paper-handling mechanism for a laser printer.

2. Description of the Prior Art

In a known form of laser printer produced and sold by BDT Products, Inc., the paper in cut sheet form is stacked in one or more magazines or supply trays which are positioned at an inclined vertical angle relative to the horizontal center axis of the rotatable photosensitive drum of the printer. Sheets of paper are fed through the printing station and, following printing by the drum, are delivered to a horizontally disposed output tray.

In another known form of laser printer, known as Macintosh, produced and sold by Apple Computer, Inc. a supply of paper in cut sheet form is stacked in a downwardly inclined magazine or supply tray and the sheets of paper, following printing by a photosensitive drum, are delivered to an upwardly inclined output tray. In the Macintosh printer, the control cabinet is positioned horizontally at one side of the drum.

In a prior art U.S. Pat. No. 4,492,455 issued Jan. 8, 1985 to Fuji Photo Film Company, Ltd. Japan, paper in cut sheet form is held in a vertically disposed supply tray or magazine and is fed downwardly past a scanning drum and is then discharged horizontally.

SUMMARY OF THE INVENTION

The present invention is particularly concerned with desk top laser printers and paper handling mechanisms therefor. By the present invention, the amount of desk top space taken up by the laser printer and its associated paper handling mechanism is substantially reduced. This is an important advantage in view of the increasing number of sophisticated equipments now being used by office workers.

In accordance with the present invention, a laser printer is used which has a drum positioned substantially on the horizontal center axis of the "engine" with the other components of the engine being positioned on each side of the center axis. The laser printer engine occupies a generally rectangular base area. The paper-handling mechanism is positioned below the laser printer engine and is confined within the limits of a rectangular area defined by the vertically downward projections of the edges of the area occupied by the laser printer engine. The paper handling mechanism comprises a vertically disposed supply magazine having an open top end for receiving a stack of cut sheet paper, feed means for feeding a top sheet of cut paper upwardly from the supply magazine into the printing station of the laser printer engine, feed means for delivering a sheet of printed paper from the printing station downwardly, and a generally vertically positioned open-top output tray for receiving the downwardly moving sheet of printed paper.

DETAILED DESCRIPTION OF THE PREFERRED EMBODIMENTS

Figure 1:
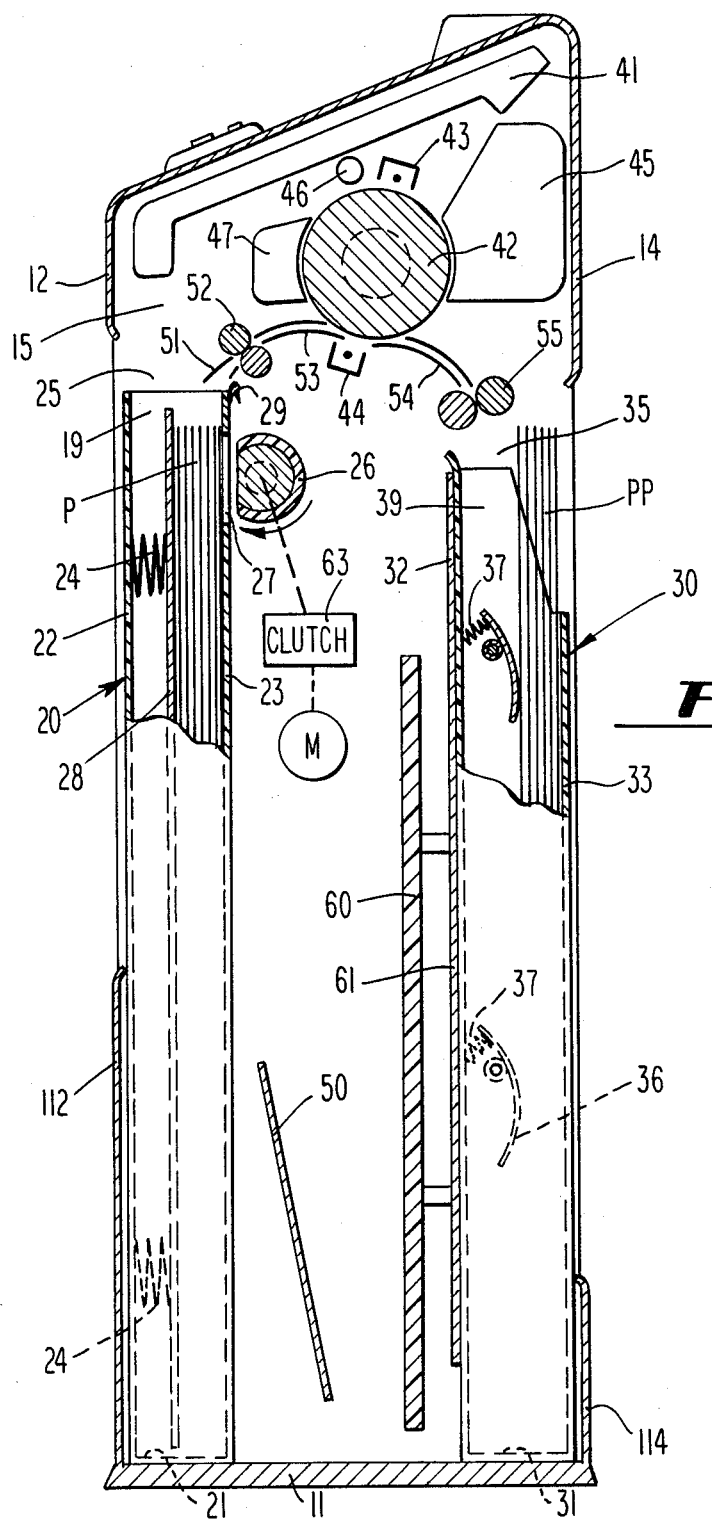
FIG. 1 is a diagrammatic elevational side view, in section, of the interior of a cabinet or housing containing a laser printer engine and paper handling mechanism according to the present invention.

In FIG. 1 a cabinet or housing has a base 11, upper and lower front wall segments 12, 112, upper and lower rear wall segments 14, 114 and a pair of sidewalls 15, 115. In the drawing only sidewall 15 is visible. Located between the upper and lower front wall segments 12, 112 is an opening through which is inserted and removed a supply magazine or input tray 20 containing a supply of cut sheets of paper P. Similarly, between upper and lower rear wall segments 14, 114 is an opening through which an output tray 30 is inserted and removed. The sidewalls 15, 115 of the housing extend for its full height.

Supported, as by side walls 15, 115 at the top of the housing is a laser printer engine which includes the usual components such as scanner 41, photo-sensitive drum 42, electric charger 43, transfer charger 44, toner supply 45, preconditioning lamp 46 and cleaner 47. As mentioned previously, the drum 42 is positioned on the center axis of the engine and its other components are positioned to either side of the engine in a generally balanced arrangement.

Positioned below the laser printer engine are the previously mentioned input and output trays 20, 30 for containing cut sheets of unprinted paper P and printed paper PP. These trays 20, 30 when fully inserted into the cabinet are positioned within a rectangular area defined by the side walls 15, 115 of the cabinet and by the downward projections of the front and rear wall segments 12, 14. Thus, the "footprint" i.e., the space occupied by the entire laser printer and associated paper-handling mechanism on the desk of the user, is no larger than the space occupied by the laser printer engine which in accordance with a preferred embodiment of the present invention, is positioned directly above the paper-handling mechanism. In the mechanism, as illustrated in FIG. 1, the "footprint" is a rectangular area 6½ inches by 10 inches. This is small in comparison to the size of footprints of known laser printers and associated paper-handling equipment.

Figure 2:
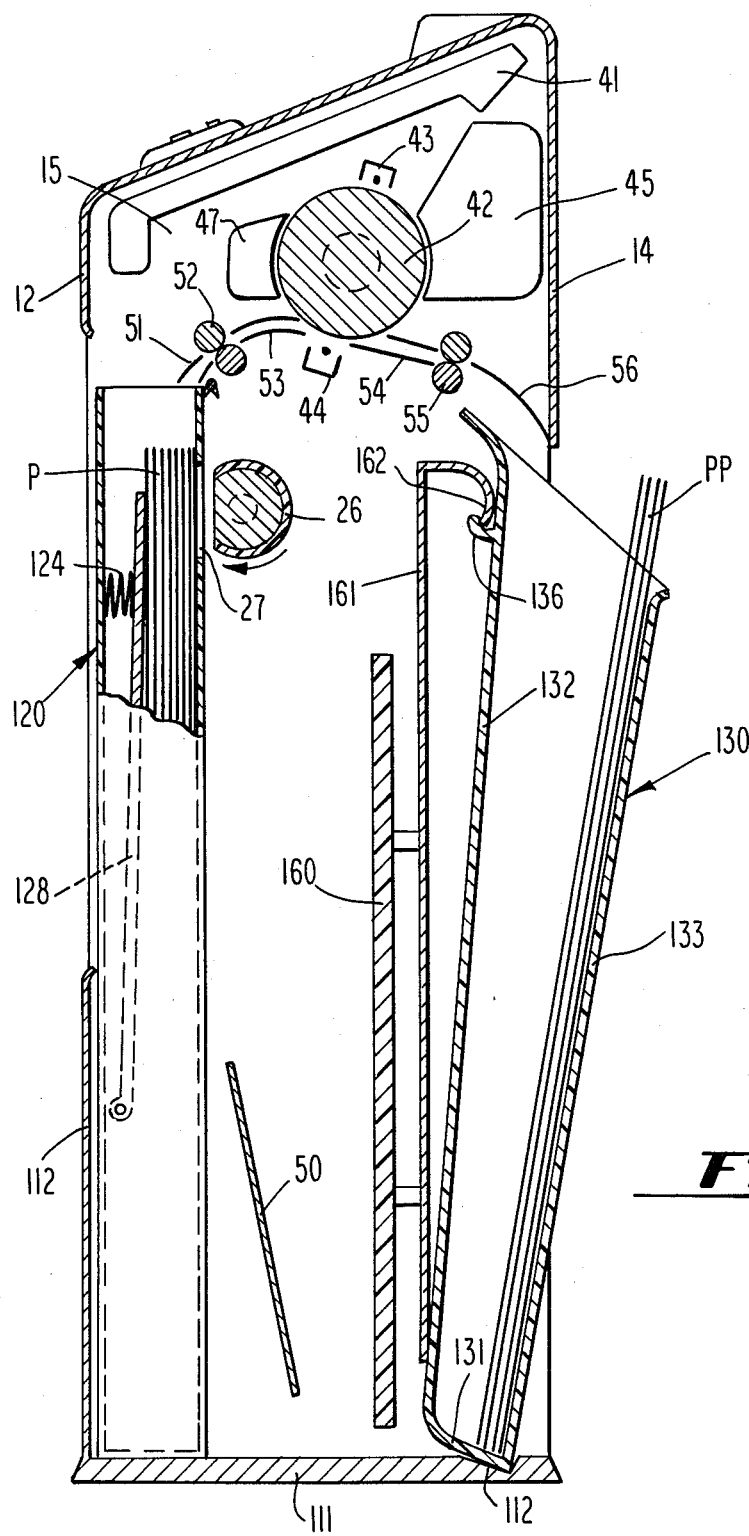
FIG. 2 is a diagrammatic side elevational view, in section, showing alternate forms of supply and output trays.

In an alternate embodiment illustrated in FIG. 2, the output tray 130 when inserted into the cabinet occupies a somewhat angular or inclined position as distinguished from the purely vertical position of output tray 30 of FIG. 1 but the "footprints" of both embodiments are equally small.

Referring again to FIG. 1, supply magazine or input tray 20 has a pair of end walls 19, a base 21, a pair of side walls 22, 23 and an open top 25. A plurality of holding lips 29 provide inner support for the tray 20 while lower front wall segment 112 provides the outer support. A movable side wall or plate 28 is spring biased inwardly as by springs 24 so as to keep the stack of supply paper P compressed, but not too tightly, against the inner side wall 23. Slots 27 are provided in inner side wall 23 for receiving the circular portion of a set of D-shaped pick-up rollers 26. There are several D-shaped pick-up rollers in line but only one is visible in the drawing. A guard plate 50 is provided in the interior of the cabinet, positioned as shown in the drawing, so that during insertion and removal of supply tray 20, the tray does not come into contact with the control panel or printed circuit board 60 which contains the usual control components and circuitry such as RAM, PROM, CPU, etc.

Output tray 30 has a base 31, a pair of end walls 39, a pair of side walls 32, 33 and an open top end 35 for receiving sheets of printed paper PP. The sheets of printed paper PP received within output tray 30 are compressed, but not too tightly, as by curved spring biased members 36. The upper ends of members 36 are pulled inwardly by tension springs 37. A plate 61, to which printed circuit board 60 is attached, provides inner support for output tray 30 while lower rear wall segment 114 provides the outer support.

The top sheet of the stack of paper P in input tray 30 (the rightmost sheet as viewed in FIG. 1) is picked up and fed to the transfer or printing station 44 by known means. Such means may be similar to those used in the Canon Laser Printer made and sold by Canon, Inc. Japan. A motor M drives D-shaped pick-up rollers 26 through a train of gears and a coil-spring clutch 63. The coil spring is normally loose and clutch 63 is normally disengaged but the spring is tightened and the clutch engages in response to energization of a solenoid (not shown) which is controlled by command signals from the printer controller located on printed circuit board 60. When the solenoid is energized, the clutch engages and drives D-shaped pickup rollers 26 but only through a single revolution because the solenoid, following energization, is very quickly de-energized. This single revolution of pickup rollers 26 causes the top sheet of paper P, i.e., the rightmost sheet as viewed in FIG. 1, to be fed upwardly between a first set of guides 51 and into the nip of input rollers 52. Input rollers 52 are driven by the feed drive gear through a train of gears which does not include the clutch 63. Thus, input rollers 52 are constantly rotating so long as the main motor M is ON. Rollers 52 feed the sheet of paper P between a second set of guides 53 through the printing or transfer station 44 and then between a third set of guides 54 into the nip of output rollers 55. Output rollers 55 deliver the sheet of the now-printed paper PP into the open top end 35 of the output tray 30 and into position between the pressure members 36 and the bottommost sheet of paper, (leftmost sheet as viewed in FIG. 1) already in tray 30.

The path followed by the sheet of paper from the supply magazine or input tray 20 through the transfer station 44 and into the output tray 30 may be described as a "vertically up—vertically down" path. The structural arrangement illustrated in FIG. 1 is very compact and allows for a very small "footprint" on the desk of the user. As already indicated, this is deemed to be an important advantage in view of today's demand for desk space for sophisticated office equipment.

The alternate embodiment shown in FIG. 2 differs from that shown in FIG. 1 in but three or four relatively minor regards. First, the stack of paper P in input tray 120 is compressed by a pivotal plate 128, spring biased by spring 124. Second, the output tray 130, when inserted into the cabinet, snaps into place and is retained by hook member 162 which is provided at the upper end of plate 161 and which engages with a finger 136 on wall 132 of the output tray. Third, the bottom or base 131 of the output tray 130 is received within a notch 112 provided in the bottom or base 111 of the cabinet. As is illustrated in FIG. 2, output tray 130, when inserted, remains in an outwardly inclined position. However, the base 131 is inwardly positioned and as a consequence, the "footprint" of the alternate embodiment illustrated in FIG. 2 is essentially the same as in FIG. 1.

Fourth, an additional guide plate 56 is used to direct the sheets of printned paper PP into the output tray 130.

I claim:

1. A laser printer and associated paper-handling equipment comprising:
   a. a laser printer having components which include a printing drum and a printing station, said drum being positioned on the approximate center axis of the printer, said printer occupying a fixed area;
   b. paper-handling mechanism positioned within limits of an area defined by vertical projections of the edges of said fixed laser-printer area, said paper-handling mechanism comprising:
      (1) a vertically positioned magazine for a supply of cut sheet paper;
      (2) first feed means for feeding sheets of cut paper one at a time from said supply magazine through said printing station;
      (3) a generally vertically positioned output tray having an open end; and
      (4) second feed means for delivering sheets of printed paper one at a time from said printing station into said open end of said output tray.

2. Apparatus according to claim 1 wherein:
   a. said paper handling mechanism is positioned below said laser printer and within limits of an area defined by vertically downward projections of the edges of said fixed laser-printer area; and
   b. wherein said first feed means are adapted to feed sheets of cut paper one at a time upwardly from said supply magazine; and
   c. wherein said second feed means are adapted to deliver sheets of paper, one at a time, downwardly into the open end of said output tray.

3. Apparatus according to claim 2 wherein said printing station is located at the underside of said printing drum and wherein guide means are provided to guide said sheets of cut paper along a generally horizontal path through said printing station.

4. Apparatus according to claim 2 wherein a control panel for said laser printer is provided positioned below said printing drum and between said input and output trays.

5. Paper-handling mechanism for a laser printer having an engine which includes a printing drum and a printing station, said paper-handling mechanism being positioned below said laser printer engine and occupying horizontal space no larger than that occupied by said engine, said paper-handling mechanism comprising:
   a. a vertically positioned magazine for a supply of cut sheet paper, said magazine having an open top end;
   b. feed means for feeding sheets of cut paper one at a time upwardly through the open top end of said magazine;
   c. first nip rolls for receiving said sheets of paper and feeding same toward said printing station;
   d. a vertically positioned output tray having an open top end; and
   e. second nip rolls for delivering sheets of cut paper, one at a time from said printing station into the open top end of said output tray.

6. A mechanism according to claim 5 wherein guide means are provided for guiding sheets of cut paper, one at a time, from said first nip rolls through said printing station into said second nip rolls.

7. A laser printer and associated paper-handling equipment comprising:

a. a laser printer engine having a printing drum and a printing station at the undersurface of said drum, said engine occupying a fixed area in the horizontal plane;
b. paper-handling mechanism positioned below said printing station within limits of an area defined by downward vertical projections of the edges of the fixed area of said engine, said paper-handling mechanism comprising:

(1) A vertically positioned magazine for a supply of cut paper, said magazine having, and open top end;
(2) first feed means for feeding sheets of cut paper one at a time upwardly from said supply magazine and into and through said printing station;
(3) a vertically positioned output tray having an open top end; and
(4) second feed means for delivering sheets of paper one at a time from said printing station downwardly into said output tray.

* * * * *